May 26, 1931.                J. G. BLUNT                1,807,373
                    CONNECTING ROD FOR LOCOMOTIVES
                  Filed April 13, 1925      2 Sheets-Sheet 1
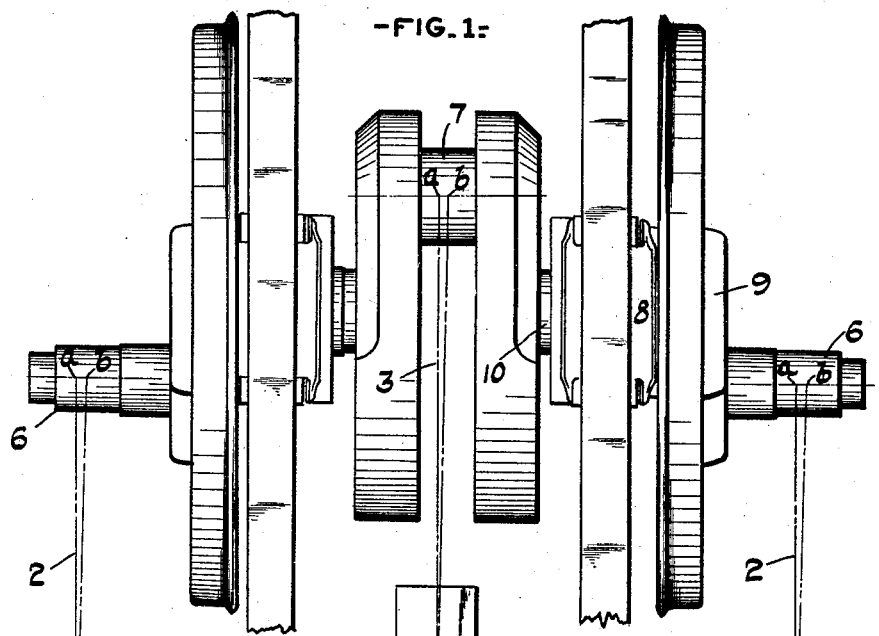
-FIG.1-
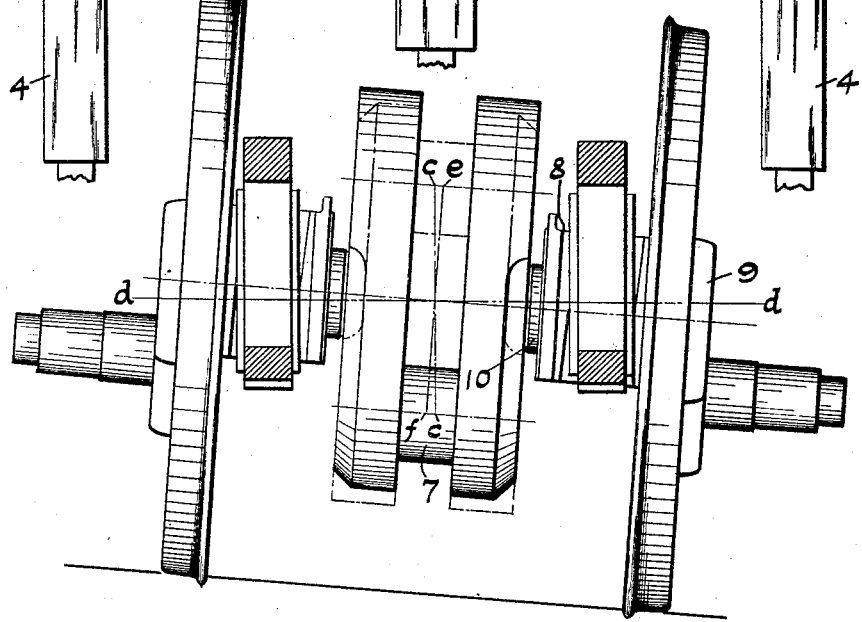
-FIG.2-
INVENTOR
James G. Blunt
BY
Clarence Kerr
ATTORNEY

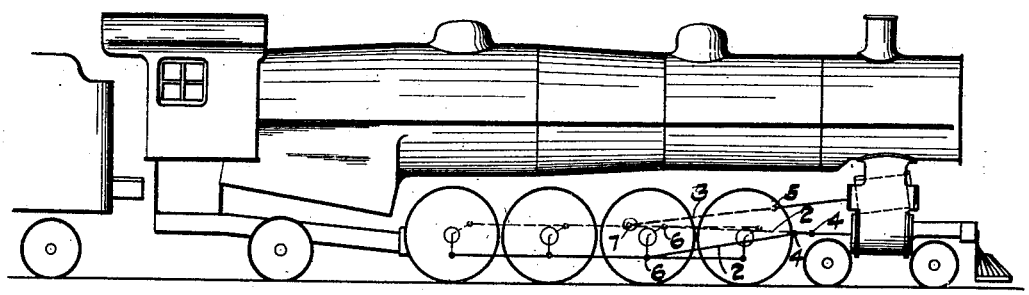

Patented May 26, 1931

1,807,373

UNITED STATES PATENT OFFICE

JAMES G. BLUNT, OF SCHENECTADY, NEW YORK

CONNECTING ROD FOR LOCOMOTIVES

Application filed April 13, 1925. Serial No. 22,761.

This invention relates to connecting rods employed in locomotive engine construction and has for its object the improvement of the rod structure to provide substantially perfect pin bearings at both ends of the rod when it is displaced angularly or laterally from normal position. In a locomotive or similar mechanism, where the power is transmitted through a connecting rod, the bearing at one end of which may, when in use, be displaced angularly or laterally with respect to the bearing at the other end, it becomes necessary to provide such means in the rod as will allow it to follow each such displacement, in order that the bearings will be prevented from cramping on their pins, and the bending and twisting in the rod body caused by such displacements will be relieved or eliminated. When the pin bearing dimensions are increased or when the locomotive cylinder is set on an incline, as in the case of the center cylinder of a three-cylinder locomotive, it becomes more necessary to make provision in the rod design to meet these conditions. The normal plane of rotation of the crank or driven end of the locomotive connecting rod is vertical, and parallel to the longitudinal center line of the locomotive, and the crosshead or driving end is guided to suit this condition only. The driving end of the rod, however, is supported by a limited movable spring suspension system, while the driven end is subject to angular or lateral movements which result from track irregularities, lateral play, and the maximum angle of the rod from the horizontal under these conditions. This is also true, although not to the same extent, in an electric locomotive where both the driving and driven ends of the connecting rod normally rotate in a vertical plane, the conditions becoming increasingly aggravated as the level of the driving end is raised above the level of the driven end of the rod. My invention is directed to correct such inherent irregularities in locomotive operation by means of a mechanism comprising a connecting rod capable of complete universal movement within the required limits and providing bearings which fit correctly throughout its range of movement. Efforts have been made before to produce a suitable rod design to meet these requirements by the use of cylindrically faced bearings, but I believe that the present invention is the first to provide perfect universality for all component movements, and at the same time, one which will retain a fixed position normal to the center line of the rod relative to one pin bearing, thus insuring its return to the true normal plane of rotation.

The construction herein described overcomes these defects in the various rod designs now used, whether reciprocating or revolving motion or a combination of the two is employed.

The improvement claimed is hereinafter fully set forth.

In the accompanying drawings: Figure 1 is a plan view of the main axle and connections, of a three-cylinder locomotive, showing the displacement of the main rods, due to lateral movement of the main driving wheels, with respect to the main frame; Fig. 2, a view, partly in elevation, and partly in section, taken through the running gear of a three-cylinder locomotive, showing the angular displacement of the main rods, due to the difference in rail elevation; Fig. 3, a side view, in elevation, showing diagrammatically the location of the main rods; Fig. 4, a side view, partly in elevation and partly in section, of the improved main rod; Fig. 5, a plan view, one-half in section, of the same; Fig. 6, a perspective view of one of the trunnion members employed to prevent cramping of the main rod on its crank pin; Fig. 7, a perspective view of the holder for the crank pin bushing; and, Figs. 8 and 9, perspective views, respectively, of the cross head pin bushing, and the holder therefor.

In the practice of the invention, referring descriptively to the specific embodiment thereof which is herein exemplified, the outside main rods 2 and the center main rod 3 connect outside crossheads 4 and center crosshead 5 to their respective crank pins 6 and 7. Under ideal conditions the rods 2 and 3 would be parallel with the longitudinal vertical middle plane of the locomotive, but the necessary provision for lateral play between the boxes 8 and wheel hubs 9 permits the axle 10 to move a limited amount to each side. The extent of this movement to one side is shown in Fig. 1 as the distance between points $a$ and $b$, but since the forward ends of the rods 2 and 3 have not a similar lateral movement because of their connection to crossheads supported from the locomotive frame, the rods must assume the angular position shown and each rod is so constructed that its bearing will not cramp its crank pin.

The effect of the elevation of one rail with respect to the other is shown in Fig. 2 in which the main axle 10 occupies a position inclined to the horizontal due to one side of the track being higher than the other and in which the center crank pin 7 is shown in two positions, namely, at the top and bottom of its throw, its uppermost position being indicated by dotted lines. The line $c$—$c$ represents the vertical middle plane of the locomotive and the line $d$—$d$ the axis of the main axle 10 under normal conditions, but due to the difference in rail level shown, the center point of the middle crank pin 7 has been deflected to point $e$ at the top of the throw and to point $f$ at the bottom of the throw, so that during a half revolution of the wheels the back end of the main rod 3 must traverse the horizontal distance between points $e$ and $f$. The line $e$—$f$ as compared to the line $c$—$c$ represents the vertical angularity which must be assumed by the rod 3. A still further variation is caused by combining the conditions illustrated in Fig. 1 with those shown in Fig. 2, so that it is readily seen the rod 3 must be constructed with capacity for completely universal movement in order to meet the range of existing conditions.

To take care of those displacements which are purely lateral, the following provision for rotation on a vertical axis is employed. The bearing on the crank pin is a bushing 11 having flanges or collars 11a for side friction and, in the case of the middle crank pin 7, is made in three sections in order to span the pin 7 between the crank discs. This bushing 11 fits into a two-piece steel holder 12 provided with vertical end faces 12b turned cylindrically. The width of this holder 12 is just sufficient to fit in between the collars 11a of bearing 11, and any movement of the crank pin relative to the axis of the main rod 3 will be transmitted immediately to holder 12. The top and bottom of holder 12 are grooved longitudinally at 12a for the reception of base portions 13a of trunnions 13, which are mounted in fixed bearings 3b in rod strap 3a bolted to the rod in the usual manner. The centers of bearings 3b in the top and bottom of rod strap 3a coincide with the vertical center of the crank pin 7 and are located in the longitudinal axis of the rod 3, so the center of swing of the rod with respect to the crank pin 7 is a line passing through the center of the trunnions 13. Cylindrically faced shoes 14 curved to match radius 12b of the bushing holder 12 and located front and rear of the holder 12 form bearings for its rotation and close the opening in the rod strap so that when assembled in place they do not require additional provisions for adjustment. The thickness of the shoes 14 is made such that the proper distance between pin centers will obtain and the axis of the back pin bearing 11 be brought into proper relation to the centers of the trunnions 13. These bearing shoes 14 are held in position sidewise by flanges 14a fitting against the sides of the rod 3 and strap 3a respectively. By boring out the center of top trunnion 13 at 13b a reservoir for a supply of lubricant for the crank pin 7 is obtained without resorting to other means, and suitable cavities 12c in the bearing holder 12 fed by holes 3c in the top of the rod strap together with holes 13c in the base of the top trunnion form reservoirs for a lubricant for surfaces 12b led to them by suitable channels and grooves.

At the front end of the main rod 3, where it is attached to the wrist pin 5a of the crosshead 5 shown in Fig. 5, a bushing 15 is used which has a spherical outer face 15a and is fitted into a two-piece steel holder 16. The halves of this holder have tongues 16a on the one fitting into grooves 16b on the other. The outside faces of the holder 16 are cylindrical, but its inside surface 16c is bored spherically to match bushing 15. The holder 16, with the bushing 15 within it, is applied by being forced into eye 3d in the forward end of the rod 3 with sufficient pressure to insure its remaining fixed in the rod 3, but the fit between the holder 16 and bushing 15 is such as to permit rotation of the bushing in the holder without lost motion. The bushing 15 may be renewed when required by pressing out the holder 16 containing the worn bushing and re-applying a new bushing 15 in a new holder 16, a proceeding which is no more difficult than renewing a solid bushing in existing rod designs. It will be noted that bushing 15 extends laterally beyond the sides of the rod for the purpose of permitting the rod to assume the angularities illustrated in Fig. 2 without striking the side walls of the crosshead 5. The employment of a spherically formed bushing 15 in the front end of the rod 3 provides completely universal movement to the rod, since it takes care of the angular displacements of the rod in both the horizontal and vertical planes. It will thus be seen that when deflection of the back end of the rod 3 occurs, its swivel point is the axis of the wrist pin 5a, and hence the bushing 15 and holder 16 permit the necessary swiveling action in all directions at this point.

While I have described my invention with particular reference to the middle rod 3 of a three-cylinder locomotive, it is obvious that it applies equally to the outside rods 2, which correspond to the rods used on a two-cylinder locomotive.

The invention claimed as new and desired to be secured by letters Patent is:

1. In a connecting rod structure for locomotives, the crank-engaging end of the rod being provided with a pivotally mounted bearing member having trunnion members extending transversely of the longitudinal axis of the rod, and the opposite ends of the bearing member having the formation of cylinder segments struck from a common center, whereby the bearing member may rock about the axis of the trunnion members to permit lateral angular movement of the rod with relation to the crank.

2. In a connecting rod structure for locomotives, the crank engaging end of the rod being provided with a two-part pivotally mounted bearing member, trunnion members fitted to the upper and lower edges of the bearing member and serving to cause the parts to pivot together, and the opposite ends of the bearing member having the formation of cylinder segments struck from a common center, whereby the bearing member may rock about the axis of the trunnion members to permit lateral angular movement of the rod with relation to the crank.

3. In a connecting rod structure for locomotives, one end of the rod being provided with a bearing member having trunnion members about the axis of which the bearing member may have pivotal movement, and the other end of the rod being provided with a bearing member having a spherical surface to permit universal movement of the member in its seat.

4. In a connecting rod structure for the centrally mounted engine of a three-cylinder locomotive, the crank-engaging end of the rod being provided with a pivotally mounted bearing member having trunnion members extending transversely of the longitudinal axis of the rod, the opposite ends of the bearing member having the formation of cylinder segments struck from a common center, and a spherically surfaced bearing member mounted in the other end of the rod, said bearing member projecting from opposite sides of the rod to provide for the lateral angular movement of the rod between the members of the cross head.

JAMES G. BLUNT.